F. C. GRANT.
PEDAL ATTACHMENT FOR AUTOMOBILES.
APPLICATION FILED APR. 9, 1917.
1,251,999.
Patented Jan. 1, 1918.
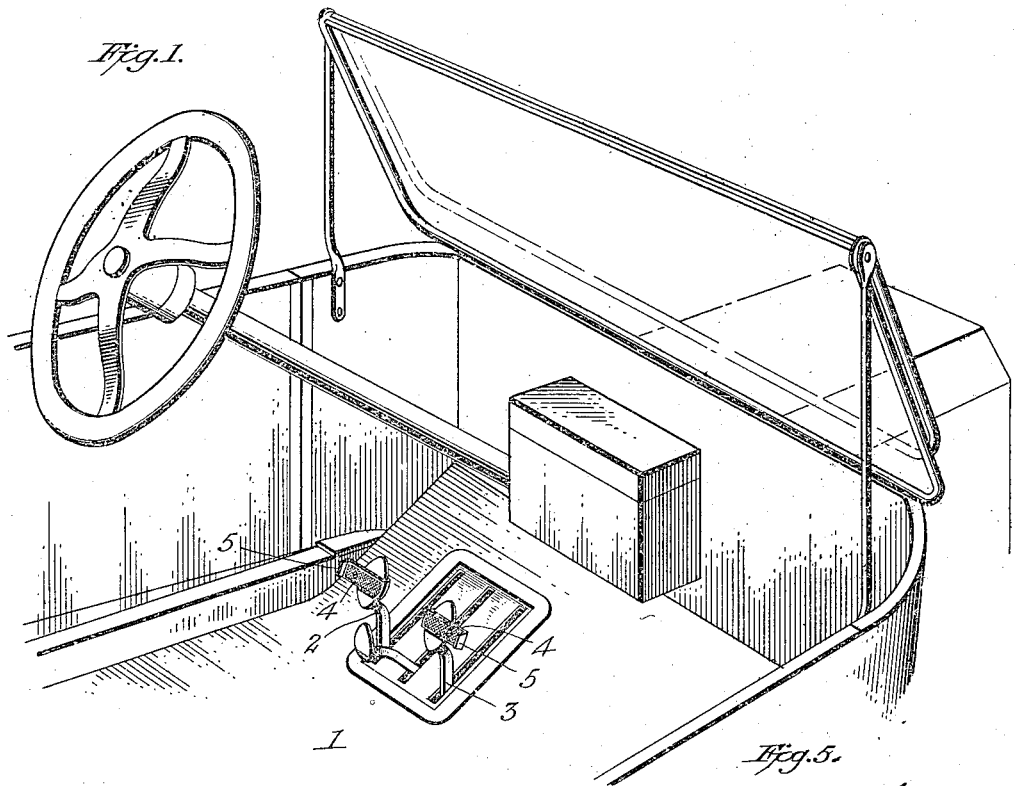
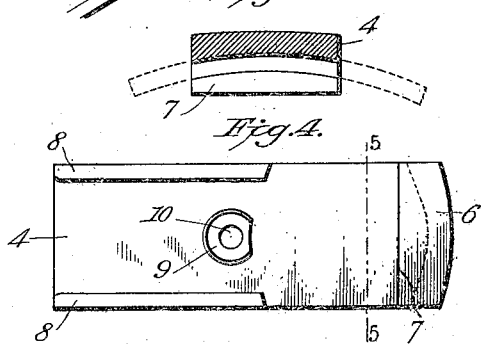
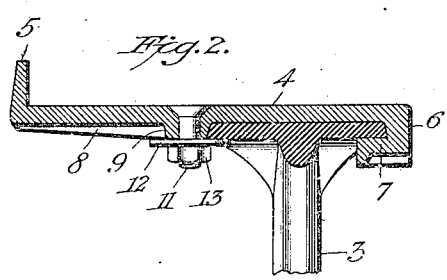
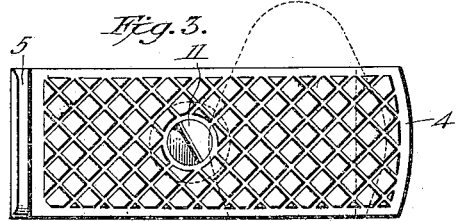
Witnesses:
G. Sargent Elliott
Adella M. Fowle
Inventor:
Frederick C. Grant.
By H. S. Bailey Attorney.

UNITED STATES PATENT OFFICE.

FREDERICK C. GRANT, OF DENVER, COLORADO.

PEDAL ATTACHMENT FOR AUTOMOBILES.

1,251,999.  Specification of Letters Patent.  Patented Jan. 1, 1918.

Application filed April 9, 1917. Serial No. 160,767.

*To all whom it may concern:*

Be it known that I, FREDERICK C. GRANT, a citizen of the United States of America, residing at the city and county of Denver and State of Colorado, have invented new and useful Pedal Attachments for Automobiles, of which the following is a specification.

This invention relates to improvements in pedal attachments, and more particularly to attachments for the foot pedals of automobiles.

The object of the invention is to provide an attachment in the form of a lateral extension plate, which is adapted to be secured upon the clutch pedal and also upon the brake pedal of an automobile, thereby to provide ample foot support for the driver of the automobile, the said plates extending in opposite directions, and being provided with vertical ledges or stops on their outer ends which prevent the driver's feet from slipping over the ends of the plates, the said plates being provided with means for rigidly securing them to the said pedals.

Further, to provide a simple, foot-supporting attachment for automobile foot pedals of a style in common use, which can be easily and quickly applied and which cannot work out of the position in which they are attached.

These objects are accomplished by the device illustrated in the accompanying drawings, in which:

Figure 1, is a perspective view of a portion of an automobile, showing the application of the improved pedal attachment.

Fig. 2, is a vertical, transverse sectional view through a pedal showing the improved foot supporting attachment secured thereto.

Fig. 3, is a plan view of the attachment, the pedal being shown in dotted lines.

Fig. 4, is a bottom view of the attachment.

Fig. 5, is a transverse, sectional view on the line 5—5 of Fig. 4.

Similar letters of reference refer to similar parts throughout the several views.

Certain styles of automobiles in common use are provided with pedals for operating the clutch and brake, respectively, which are of such size and shape as to render their manipulation both troublesome and inconvenient.

The person driving a car always keeps one foot on the brake pedal and the other foot on the clutch pedal for immediate action, and these pedals in some cars are so small that the driver finds it a difficult matter to keep his feet on them, and more particularly when they are not provided with anything in the nature of a stop to keep the feet from a lateral sliding movement, and the liability of accident is greatly increased should either foot slip from its pedal at a critical moment. The present invention overcomes these objectionable features by providing an attachment which is quickly and easily applied to the pedals, which affords ample support for the feet, and which keeps the feet from slipping over the outer ends of the pedals.

Referring to the accompanying drawings:

The numeral 1 indicates the body portion of an automobile; 2, the clutch pedal; and 3, the brake pedal. These pedals illustrate a type of pedal in common use, which are provided with foot portions that are substantially elliptical in form, and so relatively small as to provide inadequate support for feet of average size, and the improved attachment is adapted to be applied to this style of pedal, to provide adequate support for the feet of the driver of the car.

The improved pedal attachment comprises a metal plate 4, of suitable dimensions, one end of which terminates in an upright stop 5, the upper face of said plate being serrated as shown, to prevent slipping of the foot of the driver. The opposite end of the plate, on its under side, is formed with a depending member or lug 6, which is recessed transversely to form an inwardly turned lip 7, which extends the width of the plate, and is spaced from the plate a distance equal to the thickness of the foot portion of the pedal, and this lip 7 forms one of the pedal-engaging elements of the plate 4. The end wall of the recess, between the plate 4 and the lip 7, is curved to conform to the curved edge of the pedal, as will be seen by reference to Figs. 3, 4 and 6, and the edge of the pedal abuts against the wall when the attachment is secured on the pedal as shown by Fig. 2.

Upon the opposite side edges of the under side of the plate 4, are formed ribs 8, which extend inward from that end of the plate having the stop 5, and terminate at such points as to abut against the adjacent edge of the pedal, and thus coöperate with the end wall of the recess in the lug 6, in positioning the plate on the foot portion of the pedal, and also in preventing endwise movement of the said plate with respect to the pedal.

A depending lug 9 is also formed on the under side of the plate, centrally of its width, and it also acts in conjunction with the ends of the ribs 8, as an abutment for the adjacent edge of the pedal; the abutting edge of the lug being curved, as shown, to conform to the curved edge of the pedal. An axial hole 10 extends through the lug 9 and also through the plate, and the plate is countersunk around the upper end of the hole 10, to receive the head of a screw 11, which extends loosely through the hole 10 and beyond the end of the lug 9. A washer 12, is placed on the lower end of the screw, and a nut 13 is screwed against the washer, and serves to clamp the washer against the under face of the foot portion of the pedal, and the washer thus acts in conjunction with the lip 7, to hold the plate 4, in rigid engagement with the pedal, the curved edges of the pedal preventing endwise movement of the said plate.

While I have shown the attachment in the form of a casting, it is apparent that the same may be stamped from sheet metal or made by drop forging.

Having described my invention, what I claim as new and desire to secure by Letters Patent, is:

1. In a pedal attachment of the character described, a plate having a pedal engaging lip on one end thereof, a stop on its opposite end, and a clamping element spaced from said lip and supported in said plate and adapted to coöperate with said lip in engaging a pedal.

2. In a pedal attachment of the character described, a plate having a pedal engaging lip on one end, a stop on its opposite end, and a clamping element spaced from said lip, and comprising a screw extending through said plate, a clamping member on said screw adapted to coöperate with said lip in engaging a pedal, and a nut on said screw for engaging said clamping member.

3. In a pedal attachment of the character described, a plate, having a lug on one end which is recessed to form an engaging lip, for one edge portion of a pedal, a foot engaging stop on the other end thereof abutments on said plate including an apertured lug for engaging the opposite edge portion of a pedal, a screw extending through said apertured lug, a clamping member on said screw and a nut on said screw for engaging said clamping member, said clamping member and said lip acting to secure said plate to a pedal.

4. In a pedal attachment of the character described, the combination with a pedal of a plate having an introverted lip on one end for overlapping one edge portion of the pedal, abutments including an apertured lug on said plate, for engaging the opposite edge portion of the pedal, a screw extending down through and beyond said apertured lug, a clamping member on said screw for overlapping the adjacent edge portion of the pedal, and a nut on said screw for engaging and clamping said clamping member against said pedal, said attachment having a foot engaging stop on the end thereof opposite its pedal-engaging lip.

In testimony whereof I affix my signature in presence of two witnesses.

FREDERICK C. GRANT.

Witnesses:
G. SARGENT ELLIOTT,
ADELLA M. FOWLE.